(12) United States Patent
Eckhart

(10) Patent No.: US 7,561,063 B2
(45) Date of Patent: Jul. 14, 2009

(54) MOBILE TERMINALS INCLUDING LOCATION MANAGEMENT SYSTEMS AND LOCATION MANAGEMENT METHODS FOR MOBILE TERMINALS

(75) Inventor: Colin John Eckhart, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 319 days.

(21) Appl. No.: 11/714,053

(22) Filed: Mar. 5, 2007

(65) Prior Publication Data
US 2008/0218405 A1 Sep. 11, 2008

(51) Int. Cl.
G08G 1/00 (2006.01)

(52) U.S. Cl. .......... 340/901; 340/990; 340/988; 340/989; 340/995.1; 340/995.18; 340/539.13; 340/539.17; 455/457; 455/459; 701/201; 701/208; 701/211

(58) Field of Classification Search .......... 340/901, 340/995.1, 995.18, 988, 989, 990, 539.13, 340/539.17; 455/456, 457, 459; 701/201, 701/208, 211
See application file for complete search history.

(56) References Cited

U.S. PATENT DOCUMENTS

| | | | |
|---|---|---|---|
| 5,790,974 A * | 8/1998 | Tognazzini | 455/456.5 |
| 6,360,101 B1 * | 3/2002 | Irvin | 455/456.6 |
| 6,958,692 B1 * | 10/2005 | Ratschunas | 340/539.13 |
| 2003/0060979 A1 * | 3/2003 | Andrews et al. | 701/213 |
| 2005/0165543 A1 | 7/2005 | Yokota | |

FOREIGN PATENT DOCUMENTS

| | | |
|---|---|---|
| WO | WO 01/29512 A1 | 4/2001 |
| WO | WO 02/15148 A1 | 2/2002 |
| WO | WO 02/071365 A1 | 9/2002 |

OTHER PUBLICATIONS

International Search Report and Written Opinion (13 pages) corresponding to International Application No. PCT/US2007/022382; Mailing Date: Sep. 12, 2008.

* cited by examiner

*Primary Examiner*—Tai T Nguyen
(74) *Attorney, Agent, or Firm*—Myers Bigel Sibley & Sajovec

(57) ABSTRACT

Methods of managing a location of a mobile terminal include obtaining a position of the mobile terminal, estimating a distance from the mobile terminal to a destination point, generating an estimated time for the mobile terminal to reach the destination point, and generating an alert if the estimated time for the mobile terminal to reach the destination point reaches a threshold time. Related mobile terminals are also disclosed.

17 Claims, 6 Drawing Sheets

MOBILE TERMINALS INCLUDING LOCATION MANAGEMENT SYSTEMS AND LOCATION MANAGEMENT METHODS FOR MOBILE TERMINALS

FIELD OF THE INVENTION

The present invention relates to wireless communication terminals, and more particularly, to wireless communication terminals including functionality for determining the location of the terminal.

BACKGROUND

Wireless communication terminals are typically purchased by a user for the purpose of obtaining access to wireless telephone services through a cellular telephone network. However, as the capabilities of communication mobile terminals increase, an additional level of user functionality is being included in the hardware and/or software of such mobile terminals. For example, a communication terminal may be provided with a still and/or video camera, allowing pictures and/or videos to be taken by a user and transmitted from the mobile terminal to others. Likewise, many communication terminals include personal digital assistant (PDA) type applications suitable for tracking scheduling, tasks and the like. Many communication terminals also include messaging capability, such as electronic mail (e-mail), short message service (SMS) and multimedia message service (MMS) capabilities. Communication terminals may also be capable of connecting to the internet by using internet protocol (IP) over wireless and/or wired networks.

Communication terminals are also increasingly being provided with the capability of determining the physical location of the terminal. For example, many communication terminals include global positioning system (GPS) receivers that permit the terminals to determine their location with a high degree of precision. Other systems for determining the location of a communication terminal have been implemented, including systems that obtain location information from a cellular communications network, and systems that obtain location information through inertial guidance techniques.

SUMMARY

Some embodiments of the invention provide methods of managing a location of a mobile terminal. The methods include obtaining a position of the mobile terminal, estimating a distance from the mobile terminal to a destination point, generating an estimated time for the mobile terminal to reach the destination point, and generating an alert if the estimated time for the mobile terminal to reach the destination point reaches a threshold time.

Estimating a distance from the mobile terminal to a destination point may include generating a route between the position of the mobile terminal and the destination point based on a movement constraint of the mobile terminal. Generating the estimated time for the mobile terminal to reach the destination point may include generating the estimated time based on the generated route.

Generating the route may be performed in response to an operational mode of the mobile terminal. The operational mode may include a pedestrian operational mode, and the movement constraint may include at least one of a building, a bridge, a gate, or a fence. In some embodiments, the operational mode may include a vehicular operational mode, and the movement constraint may include a road.

The methods may further include measuring a current speed of the mobile terminal, and generating the estimated time for the mobile terminal to reach the destination point may include generating the estimated time in response to the current speed. In some embodiments, generating the estimated time for the mobile terminal to reach the destination point may include generating the estimated time assuming the mobile terminal travels the route at an average speed and/or a maximum speed.

The methods may further include obtaining traffic information indicative of traffic in an area between the mobile terminal and the destination point. Generating the estimated time for the mobile terminal to reach the destination point may include generating the estimated time in response to the traffic in the area between the position of the mobile terminal and the destination point.

Generating the route may include generating a quickest route between the position of the mobile terminal and the destination point in response to the traffic in the area between the mobile terminal and the destination point.

Generating the alert may include generating the alert if the estimated time for the mobile terminal to reach the destination point exceeds the threshold time. In some embodiments, generating the alert may include generating the alert if the estimated time for the mobile terminal to reach the destination point is less than the threshold time.

The methods may further include calculating a geo-temporal boundary around the destination point in response to the position of the mobile terminal, the location of the destination point, and a rate of motion of the mobile terminal. The methods may further include displaying the geo-temporal boundary on a display screen of the mobile terminal.

The methods may further include receiving a user input designating the destination point, and generating a route between the position of the mobile terminal and the destination point.

The methods may further include displaying an information box associated with the mobile terminal, the information box including an estimated time for the mobile terminal to reach the destination point. The methods may further include dynamically updating the geo-temporal boundary in response to a passage of time.

Methods of managing locations of a plurality of mobile terminals according to some embodiments of the invention include obtaining positions of the plurality of mobile terminals, estimating distances from the plurality of mobile terminals to a destination point, generating estimated times for the mobile terminals to reach the destination point, and generating an alert if the estimated time for at least one of the mobile terminals to reach the destination point reaches a threshold time.

A mobile terminal according to some embodiments of the invention includes a location management unit configured to obtain a position of a mobile terminal, and a controller. The controller is configured to estimate a distance from the position of the mobile terminal to a destination point, configured to generate an estimated time for the mobile terminal to reach the destination point, and configured to generate an alert if the estimated time for the mobile terminal to reach the destination point reaches a threshold time.

The mobile terminal may further include a traffic information unit configured to obtain traffic information indicative of traffic in an area between the position of the mobile terminal and the destination point. The controller may be further configured to generate the estimated time in response to the traffic in the area between the position of the mobile terminal and the destination point.

The controller may be further configured to calculate a geo-temporal boundary around the destination point in response to the position of the mobile terminal, the location of the destination point, and a rate of motion of the mobile terminal.

The mobile terminal may further include a map database, and the controller may be further configured to generate a route between the position of the mobile terminal and the destination point in response to map information stored in the map database.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
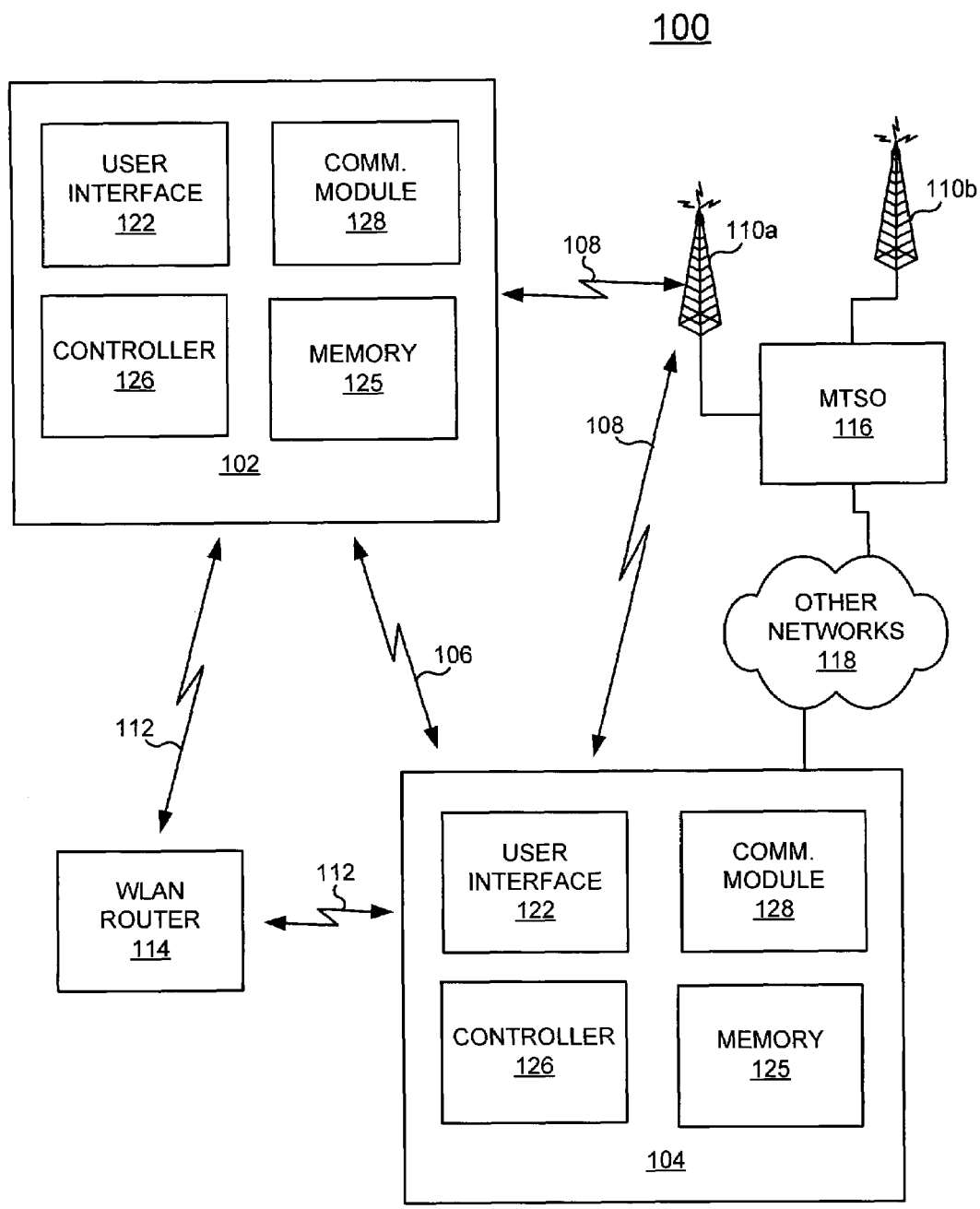
FIG. 1 is a schematic block diagram illustrating wireless communication terminals and a cellular communication system in accordance with some embodiments of the present invention.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

Embodiments according to the present invention are described with reference to block diagrams and/or operational illustrations of methods and communication terminals. It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "communication terminal" (or simply a "terminal") includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN), a digital television network such as a DVB-H network, a satellite network, an AM/FM broadcast transmitter, and/or another communication terminal. A communication terminal that is configured to communicate over a wireless interface may be referred to as a "wireless communication terminal," a "wireless terminal" and/or a "mobile terminal." Examples of mobile terminals include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Wireless communication between electronic devices may be accomplished using a wide variety of communication media, communication systems and communication standards. For example, portable electronic devices such as mobile telephones are typically configured to communicate via analog and/or digital wireless radio frequency (RF) telephone systems. Such devices may additionally be configured to communicate using wired and/or wireless local area networks (LANs), short range communication channels, such as Bluetooth RF communication channels and/or infrared communication channels, and/or long range communication systems, such as satellite communication systems.

FIG. 1 is a schematic block diagram of a wireless communication system 100 that includes two communication terminals 102, 104 that are configured to communicate data with one another over a direct wireless communication interface 106, over another wireless communication interface 108 through one or more cellular base stations 110a-b, and/or over another wireless communication interface 112 through a wireless local area network (WLAN) access point 114. The direct wireless communication interface 106 may include an RF wireless communication interface such as a Bluetooth interface or an infrared communication interface, such as, for example, the infrared communication interface defined by the Infrared Data Association (IRDA) protocols. The IRDA defines a number of standards for infrared wireless data communication, including standards for infrared wireless communication at data rates up to 16 Mb/s. It will be appreciated that one or more of the communication terminals 102, 104 may be handheld wireless communication terminals, such as mobile telephones, PDAs, and the like.

As further illustrated in FIG. 1, the terminals 102, 104 may include a user interface 122, a controller 126, a communication module 128, and a memory 125.

The communication module 128 is configured to communicate data over one or more of the wireless interfaces 106, 108, and/or 112 to another remote terminal or other communication device. The memory 125 is configured to store programs and or data for use by the controller 126. The memory 125 may include a nonvolatile memory that is capable of storing digital information even when power to the terminal 102, 104 is switched off.

The communication module 128 can include, for example, a cellular communication module, a Bluetooth module, an infrared communication module, and/or a WLAN module. With a cellular communication module, the terminals 102, 104 can communicate via the base stations 110a-b using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations 110a-b may be connected to a Mobile Telephone Switching Office (MTSO) 116, which, in turn, may be connected to one or more other networks 118 (e.g. the Internet, a public switched telephone network, and/or another network). With a Bluetooth or infrared module, the terminal 102, 104 can communicate via an ad-hoc network using the direct interface 106. With a WLAN module, the terminal 102, 104 can communicate through the WLAN router 114 using a communication protocol that may include, but is not limited to, 802.11a, 802.11b, 802.11e, 802.11g, and/or 802.11i. One or more of the terminals 102, 104 may also be configured to communicate directly over the networks 118 as shown in FIG. 1.

The terminals 102, 104 may be configured to transmit and/or receive a digital data signal between one another and/or with another communication terminal that may be communicatively coupled thereto through, for example the MTSO 116, and/or another network 118, such as a public switched telephone network (PSTN). However, it will be appreciated that data communication between terminals 102, 104 may be accomplished without using the MTSO 116 or the other networks 118.

The terminals 102, 104 my additionally include an AM/FM radio tuner, a UHF/VHF tuner, a satellite radio tuner, a DVB-H receiver, and/or another receiver configured to receive a broadcast audio/video signal.

Figure 2:
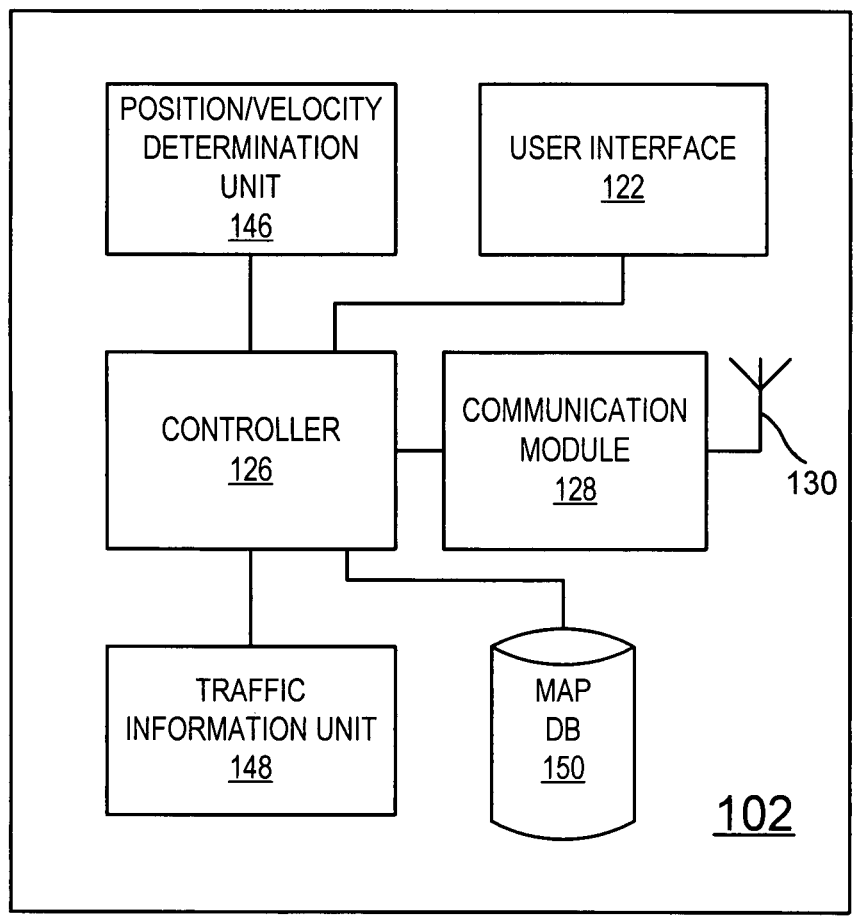
FIG. 2 is a schematic block diagram illustrating some aspects of a wireless communication terminal in accordance with some embodiments of the present invention.

Some further aspects of a terminal 102 according to some embodiments of the invention are illustrated in FIG. 2. As shown therein, a terminal 102 may further include a position/velocity determination unit 146 and a traffic information unit 148. The position/velocity determination unit 146 and the traffic information unit 148 may communicate with the communication module 128 through the controller 126 as shown in FIG. 2. Alternatively or additionally, the position/velocity determination unit 146 and/or the traffic information unit 148 may communicate directly with the communication module 128, for example through a system bus.

According to some embodiments, the position/velocity determination unit 146 may be configured to determine a current position and/or velocity of the terminal 102. For example, the position/velocity determination unit 146 may include a global positioning system (GPS) receiver that permits the position/velocity determination unit 146 to determine the location of the terminal 102 with a high degree of precision. The position/velocity determination unit 146 may include other systems and/or functionality for determining the location of the terminal 102. For example, the position/velocity determination unit 146 may be configured to obtain location information for the terminal 102 from a cellular communications network with which the terminal 102 may communicate. The position/velocity determination unit 146 may further include an inertial guidance system that permits the position/velocity determination unit 146 to determine a position/velocity of the terminal 102 through inertial movement from a known position.

The traffic information unit 148 is configured to obtain information about current automobile and/or pedestrian traffic in or near a location at which the terminal 102 is located and/or near a destination point, or along a route from a current location of the terminal 102 to a destination point. For example, traffic information may be broadcast in one or more data subchannels of a public and/or private communication network that may be received by the terminal 102. For example, Traffic Message Channel (TMC) data is available in a number of cities throughout North America and Europe. TMC data is broadcast continuously on FM radio channels, and may provide notification of accidents, road construction, police, or emergency action, etc.

Traffic information obtained by the traffic information unit 148 may be used by the controller 126 to determine estimated travel times and/or route information for a user of the terminal 102, as will be described in greater detail below.

The terminal 102 may further include a map database 150 that contains map information concerning a geographic location in which the terminal 102 is located, or in which a destination point is located. For example, the map database 150 may contain street/road information and/or may contain map information for other areas, such as pedestrian walking areas. The map information may further include information regarding features, such as buildings, fences, rivers, etc., that may constrain the motion of a user of the terminal 102.

Although the map database 150 is shown as a component of the terminal 102, it will be appreciated that the map database 150, and/or a portion of the map database 150, may be located remotely from the terminal 102. For example, the map database 150 may be stored remotely and accessed through the communication module 128. A portion of the map database 150 may be retrieved and stored locally at the terminal 102.

Figure 3:
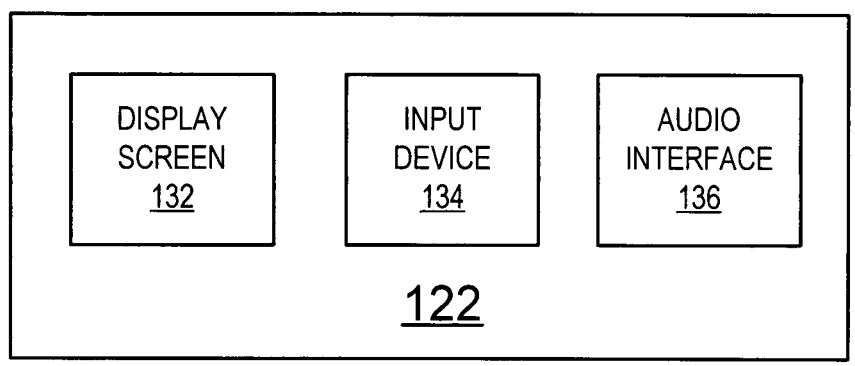
FIG. 3 is a schematic block diagram illustrating some aspects of a wireless communication terminal in accordance with some embodiments of the present invention.

Referring to FIG. 3, the user interface 122 can include an input device 134, such as a keypad, keyboard, touchpad, jog dial and/or other user input device. The user interface 122 may further include a display screen 132, such as an LCD display that is capable of displaying video signals in a video format, such as Quarter VGA (QVGA, 320×240 pixels), Common Intermediate Format (CIF, 360×288 pixels) and/or Quarter Common Intermediate Format (QCIF, 180×144 pixels). The terminal 102 may include appropriate CODECs to permit the terminal 102 to decode and display video signals in various formats. The user interface 122 can also include an audio interface unit 136 including a microphone coupled to an audio processor that is configured to generate an audio data stream responsive to sound incident on the microphone, and a speaker that generates sound responsive to an input audio signal.

Accordingly, a navigational aid, such as a map, may be displayed on the display screen 132. Furthermore, alerts and or navigational information may be communicated to a user or the terminal 102 through the audio interface 136.

According to some embodiments, a position of a terminal 102 is determined by the position/velocity determination unit 146. The controller 126 may then estimate the distance of the terminal 102 from a destination point, and may determine an estimated time for the terminal 102 to reach the destination point, assuming a given course and velocity. The controller 126 may generate an alert if the estimated time for the communication terminal to reach the destination point reaches a threshold time.

In particular, the controller 126 may determine a route between a current position of the terminal 102 and the destination point. The route may be determined based on an operational mode of the controller 126. For example, in a first mode (i.e. an unconstrained mode), the route may be determined without movement constraints on the user. Thus, the route may be a straight line from the current position of the terminal 102 to the destination point.

In some embodiments, the controller 126 may operate in a second mode ("constrained mode"), in which the route may be determined based on movement constraints. For example, the movement of the terminal 102 may be limited to movement over streets/roads.

In a third mode ("partially constrained mode"), the route may be determined based on partial movement constraints, such as the presence of buildings, fences, gates, and/or other features that may partially restrict the movement of the user and/or vehicle in which the terminal 102 is located. The partially constrained mode of operation may be suitable for locations in which the terminal 102 is carried by a user, but in which the user's movement is at least partially limited. For example, the partially constrained mode may be suitable in urban locations, where the movement of the user in certain directions may be blocked by buildings, rivers, walls and/or other geographic features, or in locations, such as theme parks, where the movement of a user of the terminal 102 is generally unconstrained but may be limited, for example, by fences, gates, etc.

The terminal 102 may also operate in a vehicular mode or a pedestrian mode of operation. In a vehicular mode of operation, the terminal 102 may be limited to movement along streets/roads (i.e. constrained mode) for purposes of route/distance/time calculation, but may be assumed to be able to move at prevailing traffic speeds. In a pedestrian mode, the terminal 102 may be assumed to be in an unconstrained mode or a partially constrained mode, but may be assumed to have a maximum speed that corresponds to an average, predicted or maximum walking speed for purposes of route/distance/time calculation.

The current speed of the terminal 102 may be determined, and the estimated time for the terminal 102 to reach the destination point may be determined based on the current speed of the user and/or the operational mode of the terminal 102. In some embodiments, an average speed may be used to determine the estimated time for the terminal 102 to reach the destination point. In other embodiments, a maximum historic speed may be used to determine the estimated time for the communication terminal to reach the destination point. In some embodiments, the velocity (speed and direction) of the terminal 102 may be determined, and the estimated time for the terminal 102 to reach the destination point may be determined based on the current velocity of the user.

In some embodiments, an alert may be generated if the estimated time for the terminal 102 to reach the destination point (assuming movement along a designated route) exceeds the threshold time. This might be the case, for example, if the terminal 102 moves too far away from a designated destination point. Thus, for example, in some embodiments, a user may wish to be notified if they move too far away from a destination point to be able to return to the destination point within a given amount of time. As an example, a user may have an appointment at a destination point at a given time. The user may wish to temporarily walk away from the destination point, but may not want to be more than, for example, 15 minutes away from the destination point. Accordingly, an alert may be generated, and the user may be notified, if it is determined that the estimated time for the user of the terminal 102 to return to the destination point is greater than 15 minutes.

In some embodiments, the alert may be generated if the estimated time for the user of the terminal 102 to reach the destination point is less than the threshold time. For example, a user may wish to be notified when they are less than 15 minutes away from a destination point that the user is traveling toward.

Figure 4:
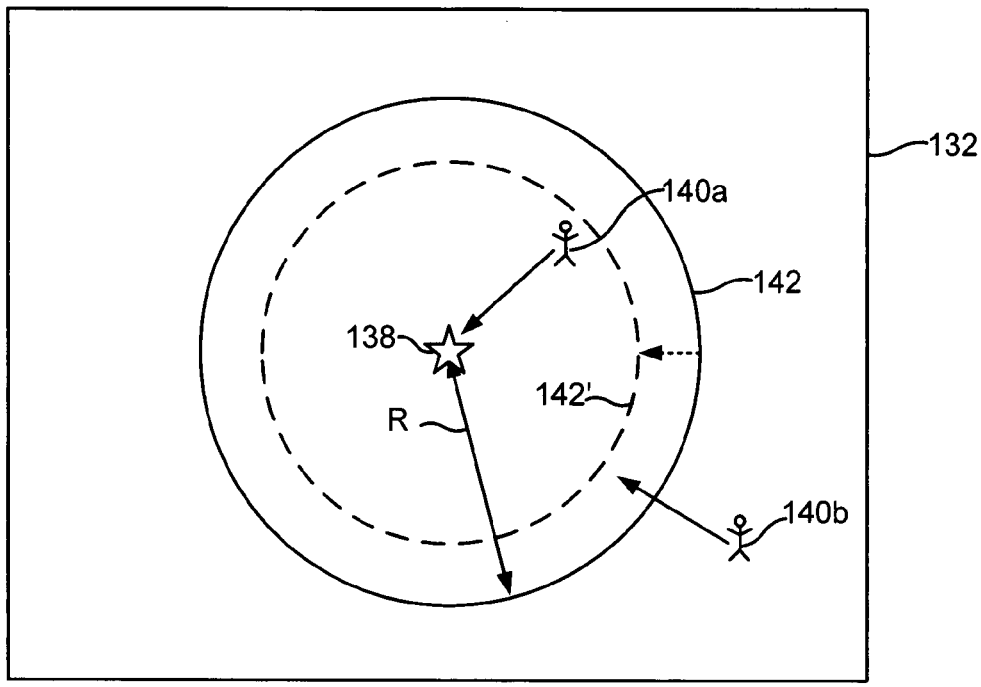
FIGS. 4-8 are exemplary illustrations of display screens configured according to some embodiments of the invention.

Some embodiments of the invention are illustrated in FIG. 4, which shows a map displayed on a display screen 132 of the terminal 102. The map displayed on the display screen 132 includes icons showing a destination point 138 (indicated by a star) and a first location 140a of a user of the terminal 102. The destination point 138 may be entered by a user of the terminal 102 and displayed by the communication terminal on the display screen 132. The user may also enter a temporal limit indicating an amount of time from the destination point 138 based on speed and/or directional constraints of the user. In the embodiments shown in FIG. 4, the terminal 102 is operating in an unconstrained mode, such that it is assumed that the user of the communication terminal may move in any direction.

In some embodiments, the terminal 102 may generate a geo-temporal boundary 142, which indicates the farthest location that the user can be from the destination point while still being less than the temporal limit away from reaching the destination point. That is, assuming the temporal limit entered by the user is 15 minutes, when the communication terminal is located just on the geo-temporal boundary 142, it is estimated that it would take the user approximately 15 minutes to reach the destination point along a chosen path. In some embodiments, the communication terminal may determine a shortest path from the current location of the terminal 102 and the geo-temporal boundary 142 may be determined based on the shortest path to the destination point.

In some embodiments, the geo-temporal boundary 142 may be explicitly calculated or estimated by the terminal 102 and displayed on the display screen 132, for example, as a shaded and/or highlighted area around a destination point 138. However, in some embodiments, the geo-temporal boundary may not be explicitly determined. Rather, the terminal 102 may periodically update an expected travel time from a current location 140 to a destination point 138, and an alert may be generated when the expected travel time equals the temporal limit established by the user.

In the embodiments shown in FIG. 4, as the movement of the user is assumed to be unconstrained, the geo-temporal boundary 142 has the shape of a circle with the destination point at the center of the circle.

The time that it is estimated to take the user to move from the current location of the terminal 102 to the destination point may be estimated with reference to an assumed movement rate (speed) of the user. The assumed speed of the user may be equal to a current speed of the user, an average speed of the user, and/or an arbitrarily chosen speed.

Accordingly, assuming unconstrained movement, the radius R of the geo-temporal boundary 142 may be given by the following equation:

$$R = S * T \quad (1)$$

where S is the assumed speed of the user and T is the temporal limit entered by the user.

In some embodiments, the location of the geo-temporal boundary may be updated at regular and/or irregular time intervals. For example, the user may specify a certain time that he or she needs to be at a destination point. In that case, the radius of the geo-temporal boundary 142 may be given by the equation:

$$R' = S^*(T-t) \quad (2)$$

where S and T are as given above, and t represents the elapsed time since the temporal limit was established. Thus, as shown in FIG. 4, after an amount of time t has elapsed, the geo-temporal boundary 142 will shrink to a new boundary 142' in proportion to the amount of time elapsed.

As an example, a visitor to a theme park may have a reservation to ride a particular ride located at a destination point 138 in the park. The user may enter the destination point into the terminal 102 and may designate a temporal limit that is less than or equal to the time remaining before the reservation time. The communication terminal may then determine a geo-temporal boundary 142 around the destination point based on the temporal limit. A map showing the geo-temporal boundary 142, the location of the destination point 138 and the current location 140 of the terminal 102 may be displayed on the display screen 132. The geo-temporal boundary 142 may be continually updated according to changes in elapsed time. Provided the user stays within the geo-temporal boundary 142, the user can have confidence that he or she will be able to reach the ride by the appointed time.

The geo-temporal boundary 142 may also be updated based on changes in the average speed of movement of the user and/or on traffic and/or congestion information obtained by the traffic information unit 148.

FIG. 4 also illustrates a user located at a location 140b outside the geo-temporal boundary 142. In some embodiments, a user may wish to be notified when he or she comes within a certain travel time of a destination point so that a predetermined action can be performed. For example, a user may wish to be notified when he or she is within ten minutes of a destination, so that the user can contact someone at the destination.

Figure 5:
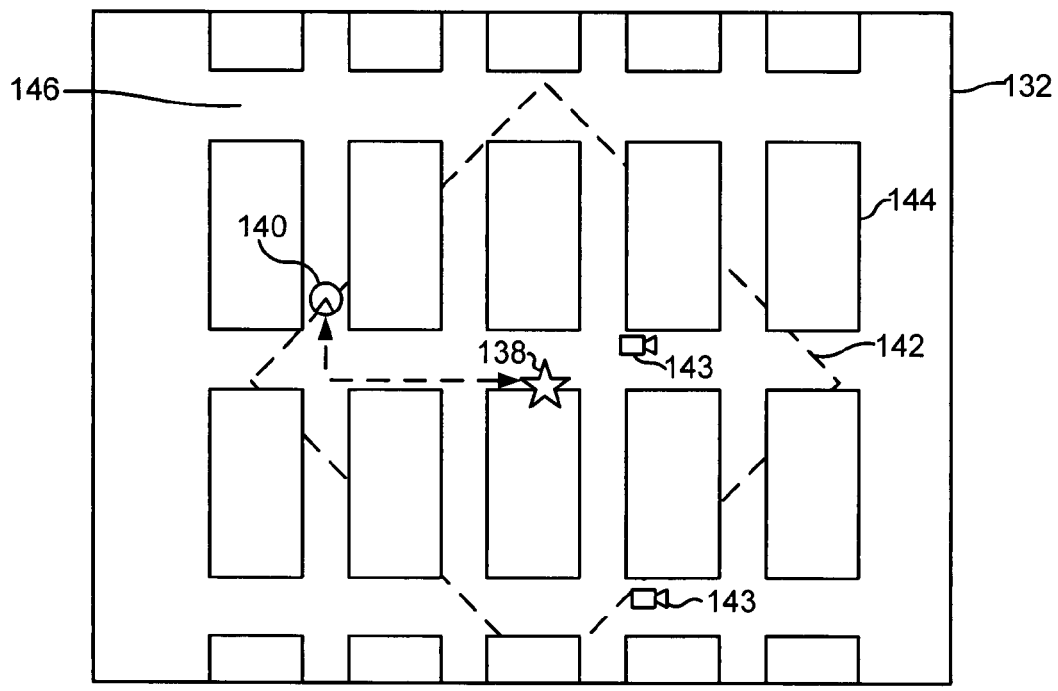

FIG. 5 illustrates a map on a display 132 of a communication terminal where the motion of the user is partially constrained. In particular, the user and the destination point 138 may be in an urban environment including streets 146 and buildings 144 that restrict movement to generally orthogonal directions (e.g. north/south and east/west). Accordingly, the geo-temporal boundary 142 may have a shape that is non-circular. In particular, since the motion of the user in the area shown in FIG. 5 is generally limited to north/south and east/west movement, the geo-temporal boundary 142 may have a generally diamond shaped periphery.

In the embodiments shown in FIG. 5, the location of the user terminal 102 is indicated by a symbol 140 that indicates position and direction of the user.

In some embodiments, traffic information may be provided to the terminal 102 by a public and/or private traffic information system, as described above. In some embodiments, one or more traffic cameras 143 or other sensors may be positioned in an area and may be used to provide an indication of vehicular and/or pedestrian traffic. The amount of traffic present in a location may be used to determine an expected and/or maximum speed of the user, which in turn may be used to determine the estimated travel time of the user to the destination point 138 and/or the location of the geo-temporal boundary 142. For example, more traffic congestion may result in slower expected speeds, which may reduce the footprint of the geo-temporal boundary 142. Traffic information and/or information concerning average or expected rates of speed may also be obtained from other location-enabled mobile terminals 102, and may be communicated to the terminal 102, for example, through a communication link 106, 108, 112 as shown in FIG. 1.

Figure 6:
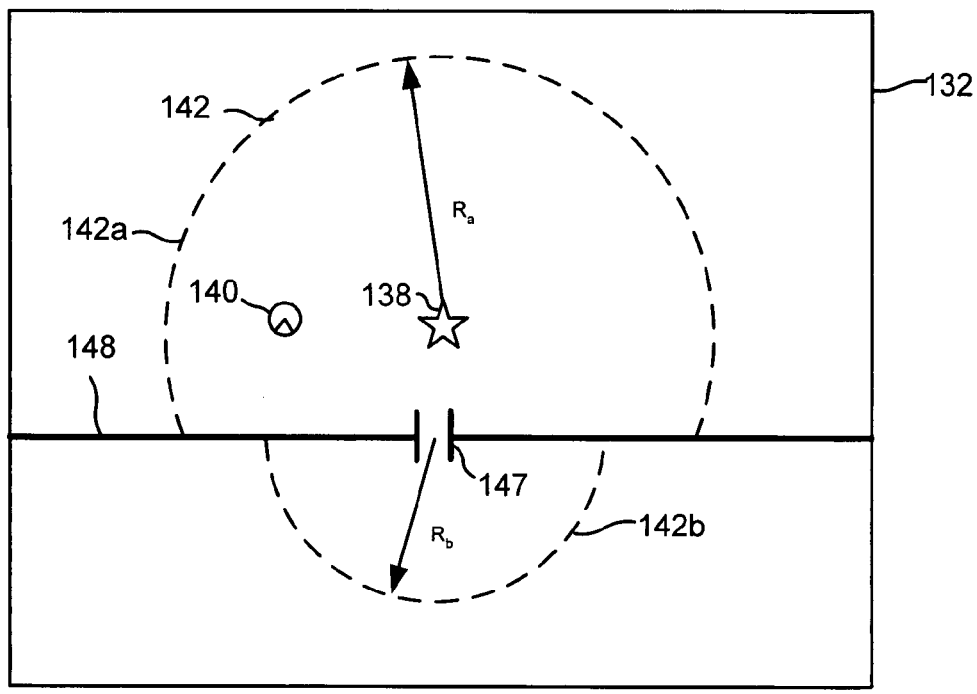

Another example of partially constrained motion is shown in FIG. 6. In the embodiments shown in FIG. 6, the user (whose location is indicated by an icon 140) and the destination point 138 are located in an urban or quasi-urban environment that includes a fence 148 that includes a gate 147. The geo-temporal boundary 142 includes a portion 142a on the same side of the fence 148 as the destination point 138 and a portion 142b on the other side of the fence 148 from the destination point 138. As shown in FIG. 6, the presence of the fence 148 and the gate 147 cause the shape of the geo-temporal boundary 142 to be distorted. For example, assuming that a temporal limit $T_L$ has been established by the user, a portion 142a of the geo-temporal boundary 142 on the same side of the fence 148 as the destination point 138 has a generally circular shape with a radius $R_a$ that is equal to $S^*T_L$, where S is the estimated movement speed of the user. Assuming that it would take the user a time of $T_1$ minutes to reach the destination point 138 from the gate 147, then the portion 142b of the geo-temporal boundary 142 on the other side of the fence would be a semicircle having a radius Rb equal to $S^*(T_L-(T_1+T_G))$, where $T_G$ represents, for example, a waiting time at the gate 147.

Distortion of the geo-temporal boundary 142 based on other movement constraints can be determined in a similar manner as described above. The more movement constraints, such as buildings, fences, gates, bridges, etc., that there are in the area around the destination point, the more distorted the geo-temporal boundary 142 may become. The geo-temporal boundary 142 may also be distorted based on changes in the expected movement speed of the user at various locations.

Figure 7:
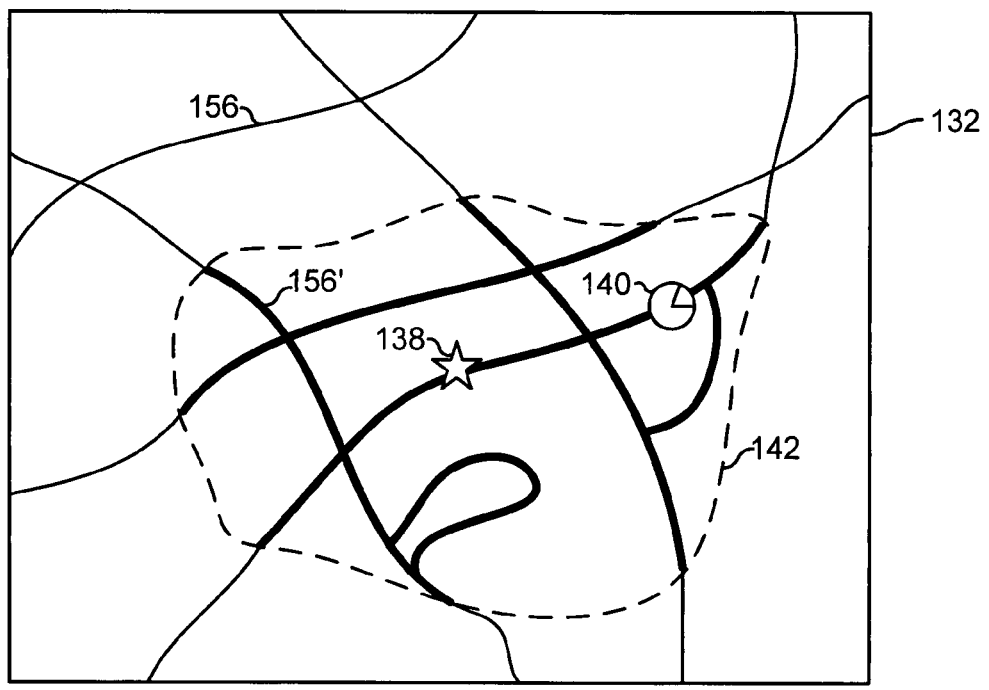

An example of a constrained mode is shown in FIG. 7, in which the display 132 shows a roadmap including roads 156. The destination point 138 is indicated by a star, and the user location is indicated by an icon 140 that indicates position and direction of movement of the terminal 102. The user location 140 is on a road 156. A geo-temporal boundary 142 is shown as including portions 156' of the roads 156 that are within a temporal limit established by the user. In some embodiments, as shown in FIG. 7, the portions 156' of the roads 156 that are within the geo-temporal boundary 142 may be highlighted, shaded, and/or otherwise marked to indicate the extent of roadway within the geo-temporal area 142.

The display format shown in FIG. 7 may be used when the terminal 102 is placed in a vehicular mode of operation, in which the movement of the terminal 102 is limited to streets/roads 156. The temporal distance of the terminal 102 from destination point 138 may be determined by establishing a route between the current position of the terminal 102 and the destination point 138. The calculation of routes using map information is known in the art, and need not be described further.

Figure 8:
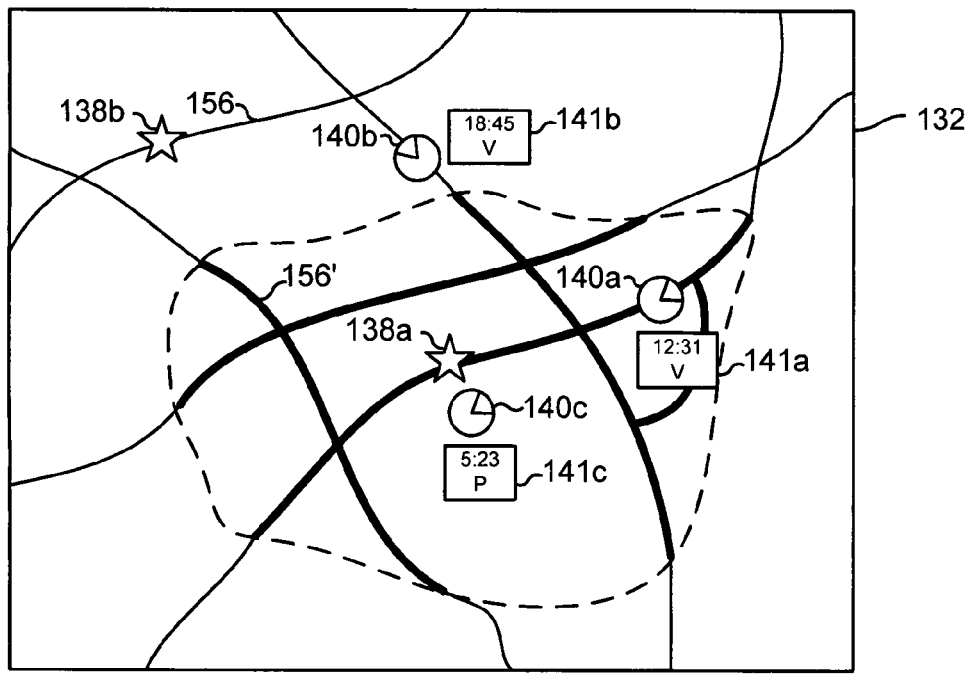

FIG. 8 illustrates further embodiments of the invention in which the locations of more than one terminal 102a-c may be displayed on the display screen 132. The current position/velocity of one or more terminals 102b, 102c may be communicated to a terminal 102a, for example, via a communication link 106, 108, 112 as illustrated in FIG. 1. The terminal 102a may display icons on the display screen 132 of the terminal 102a indicating the position and/or direction of movement of the communication terminals 102b, 102c, as well as its own position/direction. Furthermore, as illustrated in FIG. 8, an information box 141a-141c may be displayed adjacent a respective user icon 140a-140c that may indicate, for example, an estimated travel time from a selected destination point and/or a current operational mode of the terminal 102a-102c associated with the user icon 140a-1.40c.

In the example illustrated in FIG. 8, assuming that destination point 138a is the designated destination point, the terminal located at location 140a is operating in vehicular mode and has an estimated time to reach the designated destination point of 12 minutes and 31 seconds. The terminal located at location 140b is also operating in vehicular mode and has an estimated time to reach the designated destination point of 18 minutes and 45 seconds. The terminal located at location 140c is operating in pedestrian mode and has an estimated time to reach the designated destination point of 5 minutes and 23 seconds.

As further illustrated in FIG. 8, multiple destination points 138a, 138b may be shown on the display 132. Upon selection of a particular destination point 138a, 138b, the terminal 102a may display the geo-temporal boundary 142 associated with the selected destination point and/or the information boxes may be updated to display information, such as estimated travel times, relative to the selected destination point 138a, 138b.

Embodiments illustrated in FIG. 8 may be particularly useful for service providers that desire to provide a desired level of service and/or responsiveness to a particular location. For example, a service level agreement may specify that the service provider is obligated to provide less than a 15 minute response time to a given client location. Accordingly, some embodiments can be used to show if a service provider is within a designated travel time from a client location.

It will be appreciated that the terminal that is tracking and displaying the locations of the terminals 102a-102c and the destination points 138a, 138b need not be a mobile or wireless communication terminal, but could, for example, be a workstation that communicates with the terminals 102a-102c through one or more of the communication links 106, 108, 112 shown in FIG. 1.

Figure 9:
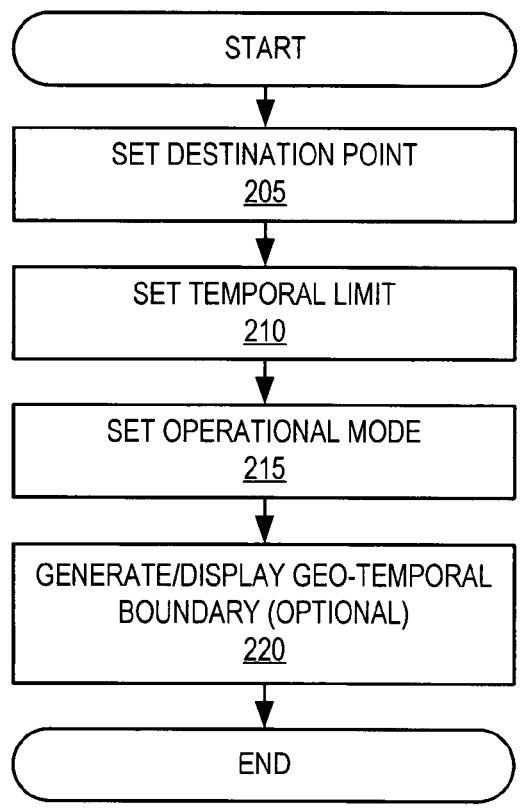
FIGS. 9-11 are flow diagrams illustrating operations of communication terminals according to some embodiments of the invention.
Figure 10:
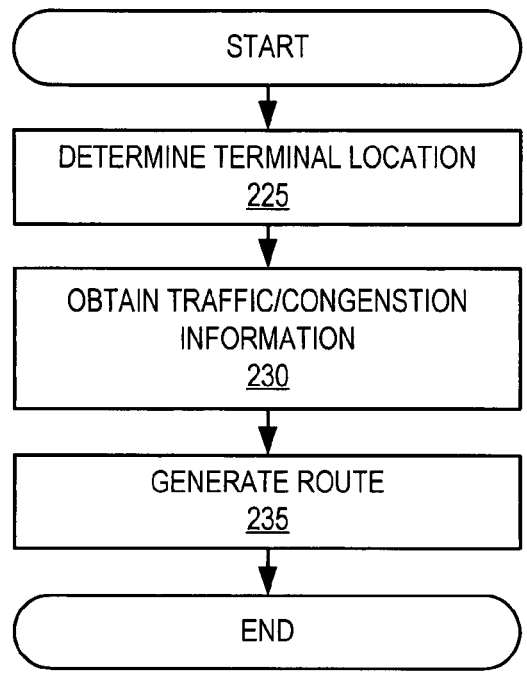
Figure 11:
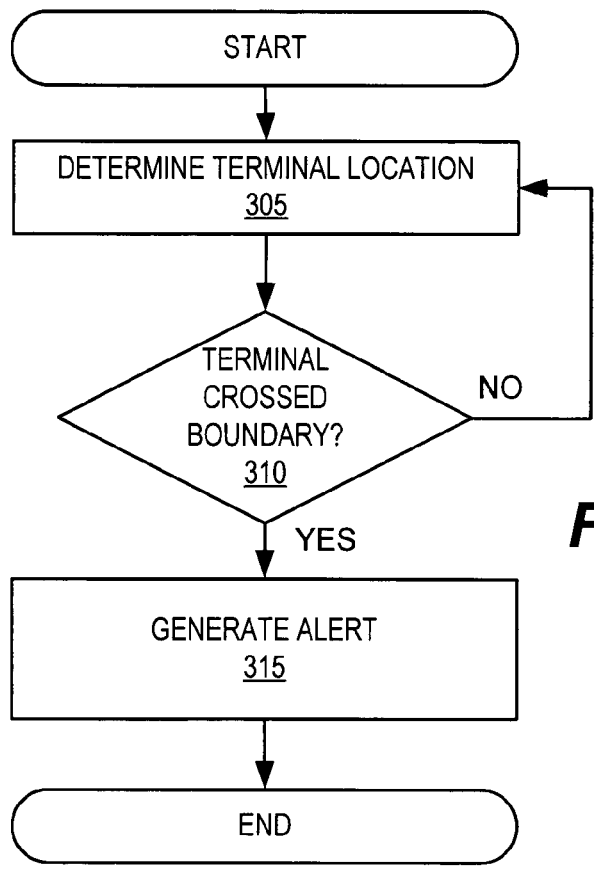

Operations according to some embodiments of the invention are illustrated in FIGS. 9 to 11, which are flowcharts of operations that may be performed by a terminal 102 that is configured as described above. Referring to FIG. 9, a user may set a destination point 138 in the terminal 102 (Block 205). The user may also set a temporal limit around the destination point (Block 210).

The user may set an operational mode of the terminal 102 for determining the distance and/or time from the destination point (Block 215). For example, the user may set the operational mode to be a pedestrian mode or a vehicular mode. In the pedestrian mode, the terminal 102 may be set to operate in an unconstrained mode or in a partially constrained mode, as described above.

The terminal 102 may optionally generate and/or display a geo-temporal boundary 142 in response to the destination point, the temporal limit, and the operational mode (Block 220). As described above, the geo-temporal boundary 142 may be determined with reference to an expected, estimated, average, and/or maximum speed of the terminal 102.

Referring to FIG. 10, in operation, the terminal 102 may determine the location of the terminal (Block 225) using the location determination unit 146 (FIG. 2). The terminal 102 may further obtain traffic/congestion information for the geographic area around the destination point 138, for example, using the traffic information unit 148 (Block 230). Next, the terminal 102 may calculate a route between the current location of the terminal 102 and the destination point 138 using the map information, the terminal location, the destination point location, and/or the traffic information (Block 235). In some embodiments, the terminal 102 may determine a fastest route between the terminal location and the destination point.

Referring to FIG. 11, the terminal 102 may determine its location using the position/velocity determination unit 146 (Block 305). The terminal 102 may then check to see if the user of the terminal 102 has crossed the geo-temporal boundary (Block 310). In some embodiments, the terminal 102 may determine if the expected travel time to the destination point 138 has reached the designated temporal limit.

If it is determined that the terminal 102 has not crossed the geo-temporal boundary 142 (or that the expected travel time to the destination point 138 has not reached the designated temporal limit) (Block 310), the operations may loop back to again determine the location of the terminal (Block 305).

However, if the terminal 102 determines that it has crossed the geo-temporal boundary 142 (Block 310), and alert may be generated and the user may be notified of the boundary crossing (bock 315).

The present invention has been described in part with reference to FIGS. 9-11, which are flowchart illustrations illustrating exemplary operations according to aspects of the present invention. It will be understood that blocks of the flowchart illustrations of FIGS. 9-11, and combinations of blocks in the flowchart illustrations, may be implemented using electronic circuits included in terminals, such as the terminal 102. It will also be appreciated that blocks of the flowchart illustrations of FIGS. 9-11, and combinations of blocks in the flowchart illustrations, may be implemented using components other than those illustrated in FIGS. 1, 2 and 2A, and that, in general, the blocks of the flowchart illustrations of FIGS. 9-11 and combinations of blocks in the flowchart illustrations, may be implemented in special purpose hardware such as discrete analog and/or digital circuitry, such as combinations of integrated circuits or one or more application specific integrated circuits (ASICs), as well as by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations of FIGS. 9-11 support electronic circuits and other means for performing the specified functions/acts, as well as combinations of steps for performing the specified functions/acts. It will be understood that the circuits and other means supported by each block of the flowchart illustrations of FIGS. 9-11, and combinations of blocks therein, can be implemented by special purpose hardware, software or firmware operating on special or general purpose data processors, or combinations thereof.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of managing a location of a mobile terminal, comprising:
   obtaining a position of the mobile terminal measuring a current speed of the mobile terminal;

estimating a distance from the mobile terminal to a destination point wherein estimating the distance from the mobile terminal to a destination point comprises generating a route between the position of the mobile terminal and the destination point based on a movement constraint of the mobile terminal;

generating an estimated time for the mobile terminal to reach the destination point wherein generating the estimated time for the mobile terminal to reach the destination point comprises generating the estimated time in response to the current speed of the mobile terminal and the generated route; and generating an alert if the estimated time for the mobile terminal to reach the destination point reaches a threshold time.

2. The method of claim 1, wherein generating the route is performed in response to an operational mode of the mobile terminal.

3. The method of claim 2, wherein the operational mode comprises a pedestrian operational mode, and wherein the movement constraint comprises at least one of a building, a bridge, a gate, or a fence.

4. The method of claim 2, wherein the operational mode comprises a vehicular operational mode, and wherein the movement constraint comprises a road.

5. The method of claim 1, wherein generating the estimated time for the mobile terminal to reach the destination point comprises generating the estimated time assuming the mobile terminal travels the route at an average speed and/or at a maximum speed.

6. The method of claim 1, further comprising:
obtaining traffic information indicative of traffic in an area between the mobile terminal and the destination point;
wherein generating the estimated time for the mobile terminal to reach the destination point comprises generating the estimated time in response to the traffic in the area between the position of the mobile terminal and the destination point.

7. The method of claim 6, wherein generating the route comprises generating a quickest route between the position of the mobile terminal and the destination point in response to the traffic in the area between the mobile terminal and the destination point.

8. The method of claim 1, wherein generating the alert comprises generating the alert if the estimated time for the mobile terminal to reach the destination point exceeds the threshold time.

9. The method of claim 1, wherein generating the alert comprises generating the alert if the estimated time for the mobile terminal to reach the destination point is less than the threshold time.

10. The method of claim 1, further comprising displaying an information box associated with the mobile terminal, the information box comprising an estimated time for the mobile terminal to reach the destination point.

11. The method of claim 1, further comprising dynamically updating the geo-temporal boundary in response to a passage of time.

12. A method of managing locations of a plurality of mobile terminals, comprising:
obtaining positions of the plurality of mobile terminals measuring a current speed of the mobile terminal;
estimating distances from the plurality of mobile terminals to a destination point wherein estimating the distances from the plurality of mobile terminals to a destination point comprises generating routes between the positions of the mobile terminals and the destination point based on movement constraints of the mobile terminals;
generating estimated times for the mobile terminals to reach the destination point wherein generating the estimated times for the mobile terminals to reach the destination point comprises generating the estimated times in response to the current speeds of the mobile terminals and the generated routes; and
generating an alert if the estimated time for at least one of the mobile terminals to reach the destination point reaches a threshold time.

13. A mobile terminal, comprising
a location management unit configured to obtain a position of a mobile terminal; and
a controller configured to estimate a distance from the position of the mobile terminal to a destination point by generating a route between the position of the mobile terminal and the destination point based on a movement constraint of the mobile terminal, configured to measure a current speed of the mobile terminal, configured to generate an estimated time for the mobile terminal to reach the destination point in response to the current speed of the mobile terminal and the generated route, and configured to generate an alert if the estimated time for the mobile terminal to reach the destination point reaches a threshold time.

14. The mobile terminal of claim 13, further comprising:
a traffic information unit configured to obtain traffic information indicative of traffic in an area between the position of the mobile terminal and the destination point;
wherein the controller is further configured to generate the estimated time in response to the traffic in the area between the position of the mobile terminal and the destination point.

15. The mobile terminal of claim 13, wherein the controller is further configured to calculate a geo-temporal boundary around the destination point in response to the position of the mobile terminal, the location of the destination point, and a rate of motion of the mobile terminal.

16. The mobile terminal of claim 13, further comprising a map database, wherein the controller is further configured to generate a route between the position of the mobile terminal and the destination point in response to map information stored in the map database.

17. A method of managing a location of a mobile terminal, comprising:
obtaining a position of the mobile terminal;
measuring a current speed of the mobile terminal;
estimating a distance from the mobile terminal to a destination point;
generating an estimated time for the mobile terminal to reach the destination point;
generating an alert if the estimated time for the mobile terminal to reach the destination point reaches a threshold time;
calculating a geo-temporal boundary around the destination point in response to the position of the mobile terminal, the location of the destination point, and the current speed of motion of the mobile terminal, wherein the geo-temporal boundary indicates a farthest distance that the mobile terminal can be from the destination point while still being less than the threshold time away from reaching the destination point; and
displaying the geo-temporal boundary on a display screen of the mobile terminal.

* * * * *

UNITED STATES PATENT AND TRADEMARK OFFICE
CERTIFICATE OF CORRECTION

PATENT NO. : 7,561,063 B2  Page 1 of 1
APPLICATION NO. : 11/714053
DATED : July 14, 2009
INVENTOR(S) : Eckhart It is certified that error appears in the above-identified patent and that said Letters Patent is hereby corrected as shown below:

In the Claims:

Column 13, Claim 12, Line 61: Please insert -- ; -- after "plurality of mobile terminals".

Column 14, Claim 13, Line 20: Please delete "," and insert -- ; -- after "speed of the mobile terminal".

Signed and Sealed this

Sixth Day of October, 2009

David J. Kappos
*Director of the United States Patent and Trademark Office*